United States Patent
Diertens

(10) Patent No.: US 7,859,130 B2
(45) Date of Patent: Dec. 28, 2010

(54) DEVICE FOR SUPPLYING POWER TO EQUIPMENT WITH VARYING REQUIREMENTS FOR THE POWER SUPPLY

(75) Inventor: John Diertens, Ridderkerk (NL)

(73) Assignee: Craneo Holding B.V., Ridderkerk (NL)

( * ) Notice: Subject to any disclaimer, the term of this patent is extended or adjusted under 35 U.S.C. 154(b) by 343 days.

(21) Appl. No.: 11/554,668

(22) Filed: Oct. 31, 2006

(65) Prior Publication Data
US 2007/0142933 A1 Jun. 21, 2007

(30) Foreign Application Priority Data
Oct. 31, 2005 (NL) ................................. 1030315

(51) Int. Cl.
*H02J 3/00* (2006.01)
*H02B 5/00* (2006.01)
*H02B 1/32* (2006.01)

(52) U.S. Cl. .............................. 307/11; 307/18; 307/29; 307/38; 361/602; 361/622; 361/626; 361/630; 361/640

(58) Field of Classification Search ................... 307/11, 307/18, 29, 38; 361/622, 626, 627, 605, 361/616, 624, 628, 630, 631, 632, 637, 601, 361/602, 640
See application file for complete search history.

(56) References Cited

U.S. PATENT DOCUMENTS

| | | | |
|---|---|---|---|
| 4,183,156 A | | 1/1980 | Rudy |
| 5,055,989 A | * | 10/1991 | Carroll et al. .................. 363/36 |
| 5,675,194 A | * | 10/1997 | Domigan ..................... 307/147 |
| 5,760,673 A | * | 6/1998 | Hassler et al. ............... 337/168 |
| 5,789,828 A | | 8/1998 | Tremaine et al. |
| 5,932,933 A | * | 8/1999 | Asanuma ...................... 307/18 |
| 6,608,406 B2 | * | 8/2003 | Bersiek ...................... 307/125 |
| 6,830,468 B2 | * | 12/2004 | Schaerer et al. ............. 439/215 |
| 2002/0070610 A1 | | 6/2002 | Bersiek ...................... 307/149 |

FOREIGN PATENT DOCUMENTS

| GB | 1 597 268 | 9/1981 |
|---|---|---|
| GB | 2 360 884 | 10/2001 |

* cited by examiner

*Primary Examiner*—Hal I Kaplan
(74) *Attorney, Agent, or Firm*—The Webb Law Firm

(57) ABSTRACT

The invention relates to a device for supplying power to equipment disposed in a space, with varying requirements for the power supply, comprising a main distributor which can be connected to a mains electricity supply and which is provided with a fuse, and at least one sub-distributor which is connected to the main distributor by means of a breakable connection, which sub-distributor is provided with equipment sockets for the connection of equipment.

17 Claims, 3 Drawing Sheets

DEVICE FOR SUPPLYING POWER TO EQUIPMENT WITH VARYING REQUIREMENTS FOR THE POWER SUPPLY

This application claims priority under 35 U.S.C. 119 to Dutch Patent Application Serial Number NL 1030315 filed Oct. 31, 2005, which is hereby incorporated by reference.

FIELD OF THE INVENTION

The present invention relates in general to the field of electrical power supply, and in particular to a device for supplying power to equipment disposed in a space, such equipment having varying requirements for the power supply.

BACKGROUND OF THE INVENTION

Devices for supplying power to equipment disposed in a space and having varying requirements for the power supply are known in the form of a power supply installation in computer spaces. Such devices are otherwise also to be found in other situations, such as in laboratories, workplaces and other, probably usually technical, spaces, buildings or parts of buildings.

Computer spaces are built and equipped to last for a period of years. During these years there is a varying requirement in respect of the electrical connections in number, type and capacity. This is the result of the continuous stream of innovations in computer equipment, this being expressed in changes in capacity (for instance 10A, 16A and 32A), variation in the type of connection (for instance single-phase, three-phase) and varying types of sockets (for instance Schuko, NEMA, CEE and IEC). The types of connection vary worldwide, wherein many countries have their own standards. The worldwide spread of economies and the associated proliferation of products results in end users being confronted with even more variation in connecting requirements.

The electrotechnical installation consists of the common techniques, wherein fixed connections (cable and socket) are arranged from one or more distributors to the desired positions. The distributor is herein provided with the fuse required for this type of connection. Connections between distributors, the distributors themselves and the terminals are rigid configurations which are fitted by a registered installer. When requirements change, cables and terminals are added to and/or replaced. The use of a registered installer is here also required. Modifications and additions thus require time and result in an untidy and/or disorganized and/or undocumented situation after various changes. Malfunctions occur regularly here and modifications cost the necessary time and effort.

This type of configuration is the result of the rapid increase in the use of computer equipment, whereby new equipment is constantly being placed in a computer space and wherein the connection to the power supply is carried out in accordance with the possibilities. This has resulted in unstructured configurations. If the maximum allowable power of a wall socket is exceeded, an electrician must be called on to make more structural power supply provisions. This is of course also the case when placing equipment which requires a three-phase power supply. The prior art thus relates to a somewhat disorganized situation, whereby detecting malfunctions and modifying the configuration has become extremely difficult.

SUMMARY OF THE INVENTION

In a preferred embodiment, the invention provides a device for supplying power to equipment disposed in a space, with varying requirements for the power supply, comprising a main distributor which can be connected to a mains electricity supply and which is provided with a fuse, and at least one sub-distributor which is connected to the main distributor by means of a breakable connection, which sub-distributor is provided with equipment sockets for the connection of equipment.

BRIEF DESCRIPTION OF THE DRAWINGS

The present invention will be elucidated hereinbelow with reference to the accompanying drawings, in which.

DETAILED DESCRIPTION OF THE PREFERRED EMBODIMENT

Figure 1:
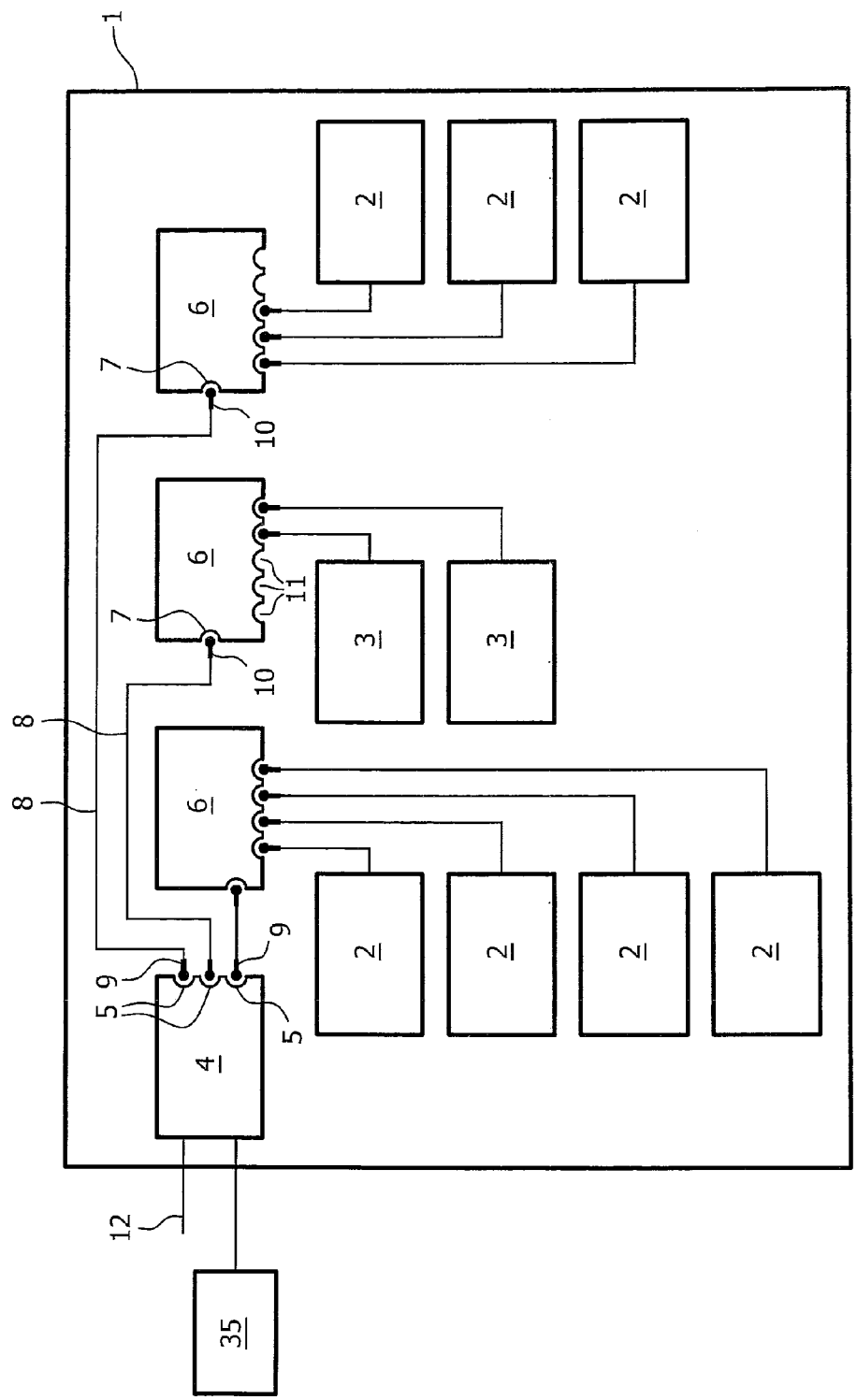
FIG. 1 shows a block diagram of a device according to the invention.

Reference will now be made in detail to the preferred embodiments of the present invention, examples of which are illustrated in the accompanying drawings.

An object of the present invention is to provide a device which, even in the case of unforeseen additions, remains structured and orderly without the intervention of a skilled electrician.

This object is achieved by such a device, wherein the at least one sub-distributor is accommodated in a sub-distributor housing accessible only to a skilled electrician.

As will be understood by those skilled in the art, a sub distributor housing can only be opened with the assistance of tools which are normally only at the disposal of a skilled electrician. This tool can be formed by a key with a square or triangular bit, but it is preferably formed by a non standard screwdriver or spanner.

This measure provides the freedom to adapt the structure of the sub-distributors to the desired power supply structure. It is after all possible to add the individual sub-distributors without making use of an electrician; no intervention need take place in the fixed installation for which an electrician would be required. The sub-distributors are no longer subjected to the limitations of a table socket, such as limited power and a single-phase power supply.

A modular and flexible arrangement of a main distributor and one or more sub-distributors is hereby obtained. The sub-distributors exist in various embodiments and are provided with the desired variation in electrical terminals.

The output side of the main distributor comprises a number of fixed terminals. The number of terminals will vary in practice and depend on the total capacity of the input of the main distributor. The main distributors can for instance be produced in diverse embodiments which can be applied in steps of differing capacity (for instance up to 20 kVA, from 20 to 40 kVA and so on).

The sub-distributors are connected to the terminals of the main distributor. These terminals must thereby be of sufficiently "heavy" type and capacity to be able to cope with the variation of terminals behind the sub-distributor. The first embodiments make use for instance of internationally standardized three-phase 400 V terminals with fuses of 63 A and 32 A. These fuses enhance safety. The terminals to the sub-distributors can be provided as desired with additional measuring equipment for displaying voltage, amperage or frequency.

The input of the sub-distributor consists of a fixed contact. Prefabricated cables, which can be connected by a layman, can hereby be used between main distributor and sub-distributor. No skilled electrician is then necessary for the purpose of exchanging and/or adding sub-distributors. The connecting cables can be supplied in diverse lengths, which can be standardized, and provided with connectors on both outer ends. The capacity of the cable and connectors is adapted to that of the terminals of the main distributor.

The sub-distributors are provided with the terminals required for the equipment. A plurality of terminals is possible per sub-distributor, the embodiments of which terminals can optionally vary relative to each other. Each terminal is individually fused at the capacity associated with this type of terminal. The terminals on the sub-distributors are embodied and fused in accordance with national and/or international standards. Known examples of national standards are Schuko (applied in, among others, Germany and the Netherlands), embodiments with earth pin (among others France and Belgium), NEMA (in among others the USA) and so forth. Examples of internationally applied embodiments are CEE and IEC.

The sub-distributors can be connected and/or changed in simple manner and without the intervention of a skilled electrician. If desired, the sub-distributors can additionally be provided with measuring equipment for displaying voltage, amperage or frequency.

The equipment can be connected to the terminals of the sub-distributors. If desired, a multiple socket cluster can here be applied first so that a plurality of apparatuses can be connected to one terminal of the sub-distributor.

Since the invention has been created to meet the requirements in computer spaces, the dimensioning and method of mounting components are aimed at what is usual in this environment, i.e. the de facto 19-inch standard.

According to a first embodiment a fuse is arranged in the main distributor, the value of which corresponds with the maximum allowable power of the sub-distributors connectable to the main distributor. Not only is safety hereby enhanced, but it moreover becomes possible to make use of greater maximum allowable power because a fuse is arranged in the power supply apparatus.

The fuse can herein be formed by a classic melting fuse, but it is recommended to make use of automatic fuses which switch off the switch associated with the fuse when a certain value of the current is exceeded. Such fuses are also known as power switches. Earth leakage switches are also deemed to be fuses within the context of this document.

A subsequent preferred embodiment provides the measure that the main distributor is provided with more than one terminal for a sub-distributor and that each terminal of a sub-distributor is coupled to a fuse with a value corresponding to the maximum allowable power of the sub-distributor. Such a configuration of the main distributor enhances safety and, due to the coupling of the fuse to the sub-distributor, moreover simplifies the detection of malfunctions.

The presence of fuses in the sub-distributor also increases safety; a further preferred embodiment provides the measure that each of the sub-distributors is provided with at least one fuse with a value which corresponds to its maximum allowable power value.

In order to prevent problems with overloading and to facilitate the detection of malfunctions it is attractive that each of the equipment sockets in the sub-distributor is provided with a fuse with a value which corresponds to the maximum allowable power of the equipment socket with which the fuse is associated.

The orderliness of the installation is considerably improved when more than one sub-distributor is incorporated in the same structural unit and when the structural unit is formed by a standard rack placed fixedly in the computer space. A standard rack is understood to mean a rack which is usual in the art, such as a 19-inch rack.

Although the use of rigid connections between the main distributor and the sub-distributor or sub-distributors is not precluded, it is recommended that each of the sub-distributors is connected to the main distributor by means of a connecting cable provided with a socket at both its ends. It is after all hereby possible to modify the configuration by means of relatively simple measures which can be carried out easily by an employee without electrotechnical training.

In order to prevent contact with voltage-carrying parts it is recommended that the main distributor is provided with a female socket for connection of a male plug of the connecting cable, and that each of the sub-distributors is provided on its powered side with a male socket for connection of a female plug of the connecting cable.

In order to prevent confusion between terminals it is important that the sockets placed on both ends of the connecting cable are of a type which is unsuitable for connection to an equipment socket.

In order to detect malfunctions, in particular so as to preclude malfunctions of the mains supply, it is recommended that at least one of the distributors is provided with a direct reading measuring instrument. It is pointed out here that, partly in respect of the increasing unreliability of the mains, more and more computer users are installing emergency power supplies, usually coupled to an uninterrupted power supply (ups). It lies within the scope of the invention that such a device is arranged on the power supply side of the device according to the present invention.

In order to increase the flexibility of the sub-distributors it is recommended that the components of the sub-distributors are each placed in a module, and that the housing of the sub-distributors is adapted to accommodate at least one module. The configuration of a sub-distributor can after all hereby be adapted to a changed future situation, albeit with the assistance of a skilled electrician since the housing of the sub-distributor to be modified must be opened.

The modularity is improved still further when at least some of the components of the sub-distributors are mounted on a DIN rail. Use can after all hereby be made of the modularity inherent to the DIN rail.

The separation of the phases of a three-phase network which normally takes place either inside the fixed installation or inside an apparatus can easily take place inside the sub-distributor due to the measures according to the present invention, since this sub-distributor is after all closed off from the outside world and is only accessible by electricians.

The invention relates to provisions for powering equipment disposed in a computer space 1. This equipment comprises computers 2 in diverse forms such as servers, codecs and peripheral equipment, but also climate control machines 3. This equipment has varying power supply requirements, particularly in respect of power. It also occurs that machines with a three-phase power supply are placed in such a space.

The invention provides a main distributor 4 which is permanently connected to the mains. It is otherwise possible for an auxiliary power supply 35, such as a 'no-break installation', to be arranged on the power supply side of main distributor 4 for the purpose of continuing the power supply when the voltage on the mains fails. The input of the main distributor is a traditional power cable which is dimensioned in accordance with the overall expected present and future current requirement. This cable comes from the main terminal and/or sub-terminal of the electrotechnical installation for the whole building, and is connected by a skilled electrician. This input can be fused and/or provided with a main switch as desired.

Main distributor 4 is provided with a number of sockets 5 for connection of sub-distributors 6. These sub-distributors 6 are provided with sockets 7. Sockets 5 of main distributor 4 are connected to sockets 7 of sub-distributors 6 by means of connecting cables 8. These connecting cables 8 are provided on an outer end with a plug contact 9 for connection to sockets 5, and on their other end with a plug contact 10 for connection to sockets 7. Sub-distributors 6 are provided on their front side with sockets 11 for connection of equipment to be supplied with power. A high degree of variability is obtained through these measures, whereby the configuration of the sub-distributors can be readily adapted to the variations in the equipment.

Figure 2:
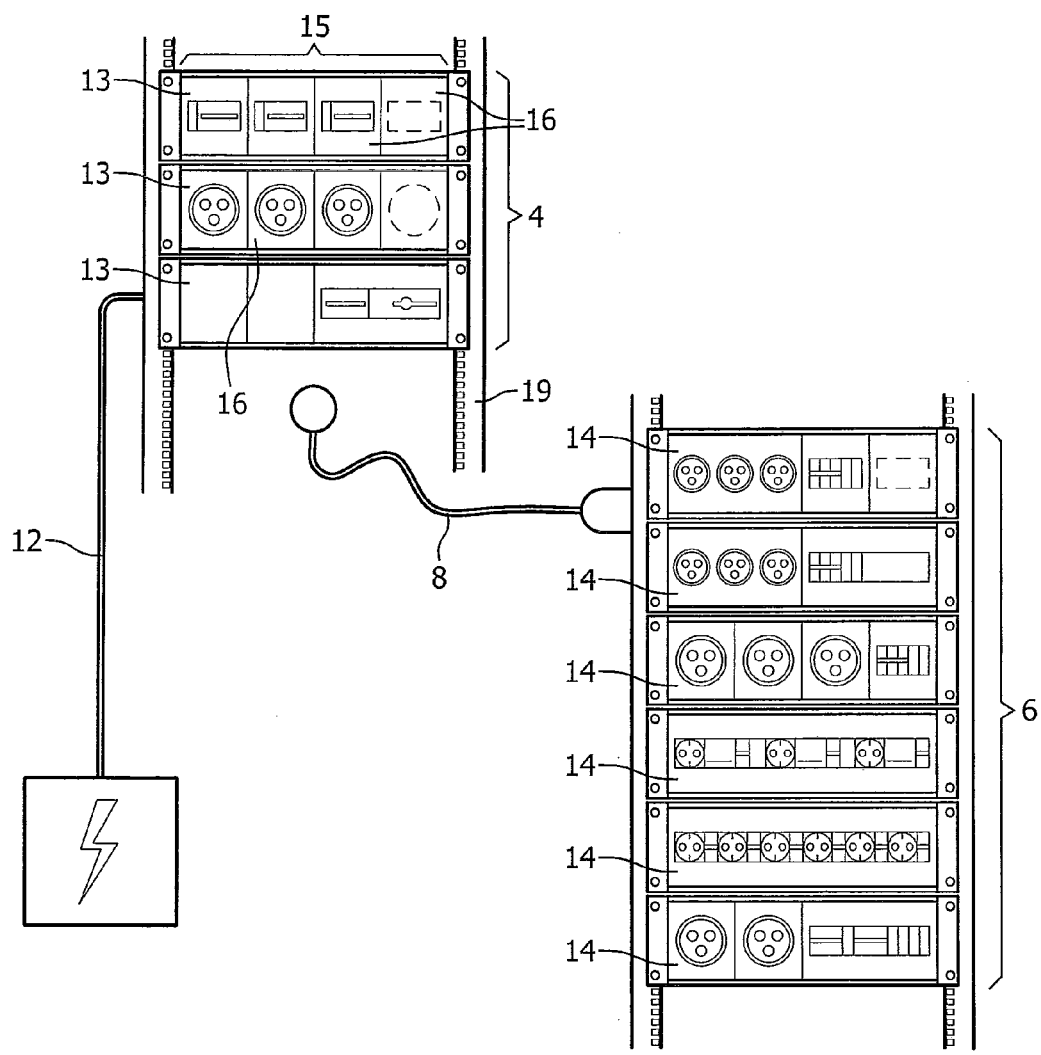
FIG. 2 is a schematic view of a number of components according to the invention.

FIG. 2 shows a schematic view of a main distributor and a sub-distributor according to the invention. Main distributor 4 is formed from a number of cabinets 13 which are placed in a rack, for instance a 19-inch rack 19. The components necessary for the function as main distributor 4, such as a fuse, switches and sockets 5, are arranged in cabinets 13.

The sub-distributor 6 shown in FIG. 2 is also assembled from a number of cabinets 14 placed in a 19-inch rack. The relevant components are here also accommodated in the cabinets. It is pointed out here that the cabinets 14 shown in FIG. 2 each have a different configuration, this being related to the equipment 2 to be supplied with power. Sub-distributor 6 is connected to main distributor 4 by means of a connecting cable 8. In the example shown here the whole assembly of the cabinets is deemed a subdistributor. It is however possible for several sub-distributors to be placed together in a single rack. The rack will generally be provided with more equipment than that which is the subject of the present invention.

FIG. 2 shows that front plate 15 of cabinets 14 of both main distributor 4 and sub-distributor 6 are provided with different modules 16. These modules 16 each comprise a component of the equipment required for the relevant distributor. A certain degree of flexibility is hereby obtained, whereby cabinet 14 of a distributor 15 can be provided with those components which are important for performing a determined function.

Figure 3:
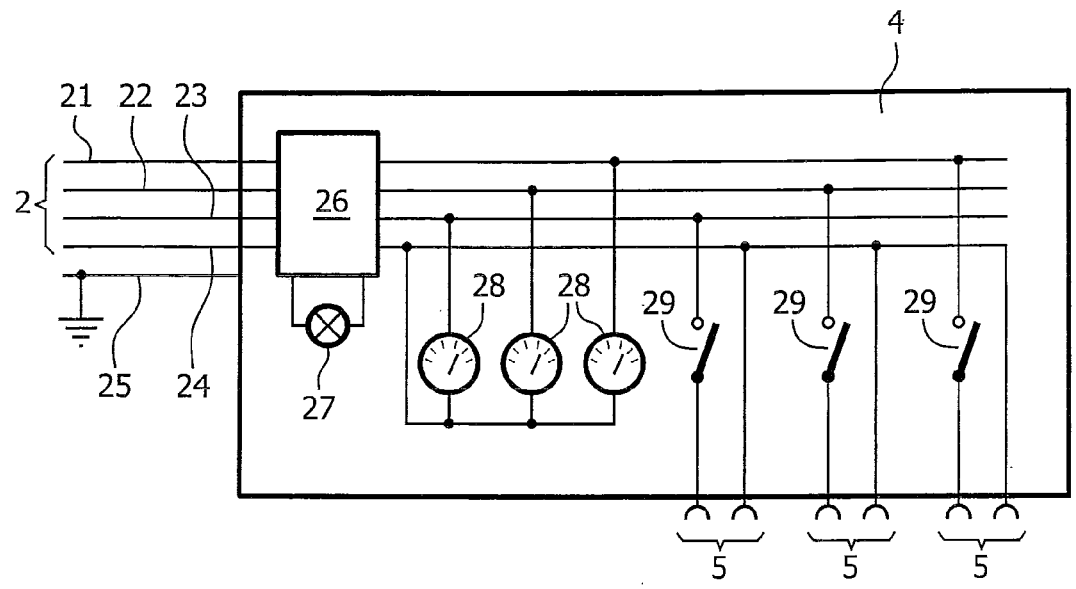
FIG. 3 shows a block diagram of a main distributor according to the invention; and, FIG. 4 shows a block diagram of a sub-distributor according to the invention.

FIG. 3 shows an example of the circuit placed in a main distributor 4. The incoming power supply line 12 comprises three phase cores 21, 22 and 23, a neutral core 24 and an earth core 25. The earth core is connected to cabinet 14 and the other cores are connected to an automatic switch 26, which is preferably provided not only with an overcurrent protection function but also a zero current protection function. Automatic switch 26 is likewise provided with an indicator light 27. Cores 21-24 are further coupled to voltmeters 28 for measuring the line voltage. The cores are finally connected to sockets 5 by means of switches 29. It will be apparent that the configuration shown here is only given by way of example and that, partly due to the modular construction of the main distributor, the configuration can be readily modified.

Figure 4:
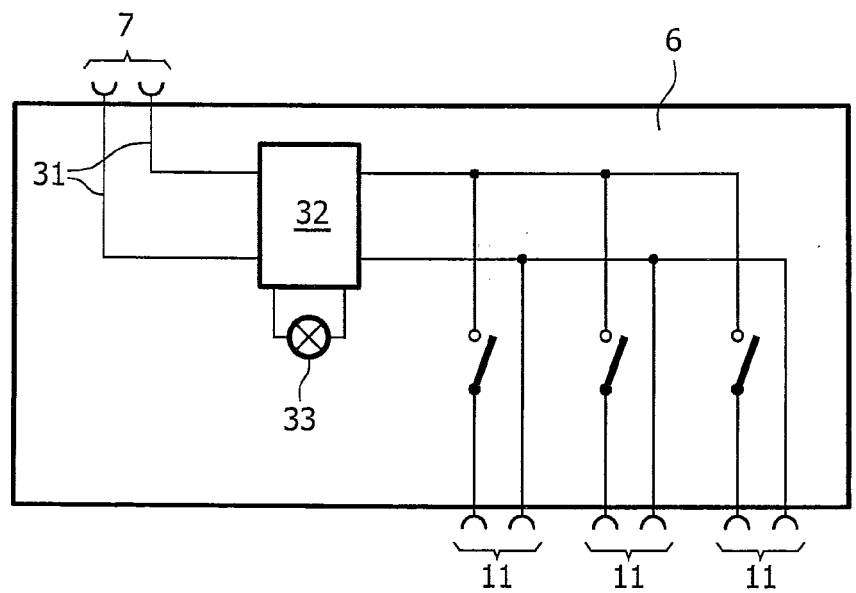
Figure 3:
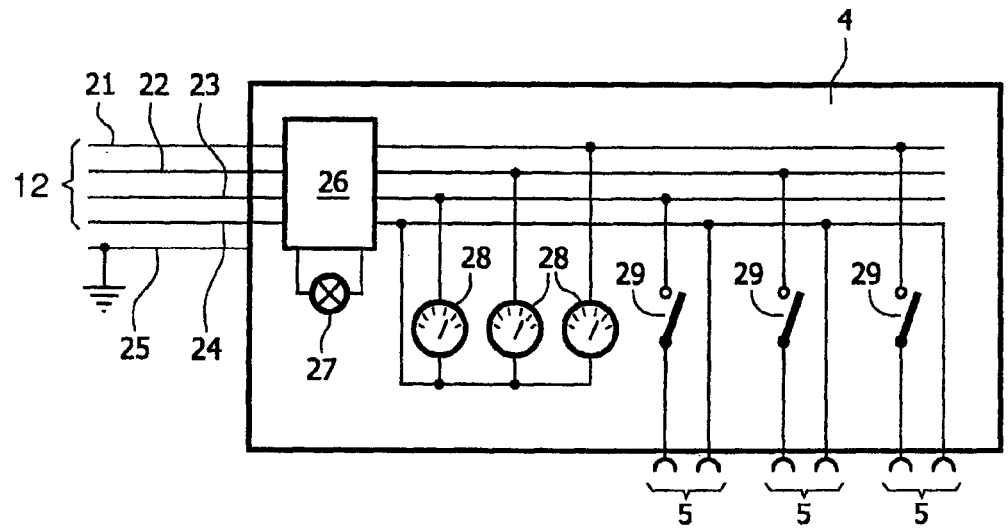
Figure 4:
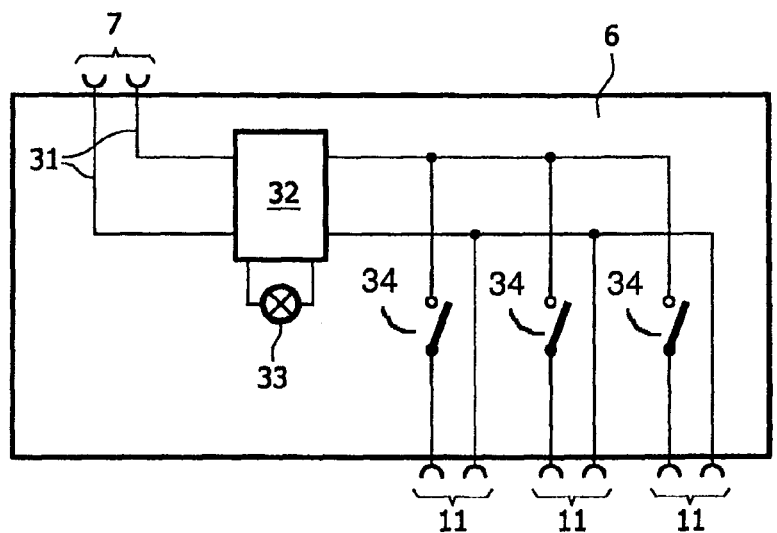

FIG. 4 shows an example of a circuit in a sub-distributor 6. This circuit comprises a socket 7 for connection of plug 10 of connecting cable 8. The conductors 31 connected to the socket lead to an automatic switch 32, the function of which corresponds with that of automatic switch 26 in the main distributor. This automatic switch is also provided with a lamp 33. The conductors exiting the automatic switch are connected by means of switches 34 to sockets 11 for connecting the power supply cables of the equipment to be supplied with power. The configuration of these sub-distributors can also be easily modified.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A device for supplying power to equipment disposed in a space, with varying requirements for the power supply, comprising:
   a main distributor formed from a plurality of cabinets, the main distributor connected to a mains electricity supply that supplies a three phase voltage and which is provided with a fuse; and
   at least one sub-distributor which is connected to the main distributor by means of a breakable connection, which sub-distributor is provided with equipment sockets for the connection of equipment,
   wherein the at least one sub-distributor is accommodated in a closed sub-distributor housing,
   the sub-distributor housing has a plurality of cabinets,
   the breakable connection has a connecting cable provided with a male plug at one end of the connecting cable and a female plug at the opposite end of the connecting cable,
   the main distributor is provided with at least one female socket for connection of the male plug of the connecting cable,
   the at least one sub-distributor is provided on its powered side with a male socket for connection of the female plug of the connecting cable,
   the space is a computer space and that the equipment is formed by computers and associated equipment,
   the plurality of cabinets of the main distributor and the at least one sub-distributor include a front plate that is provided with modules each comprising a component of the equipment, and
   the at least one sub-distributor is provided with equipment sockets for a single-phase voltage and equipment sockets for a three phase voltage.

2. The device as claimed in claim 1, characterized in that a fuse is arranged in the main distributor, the value of which corresponds with the maximum allowable power of the sub-distributors connectable to the main distributor.

3. The device as claimed in claim 2, characterized in that the main distributor is provided with more than one terminal for a sub-distributor and that each terminal for a sub-distributor is coupled to a fuse with a value corresponding to the maximum allowable power of the sub-distributor.

4. The device as claimed in claim 3, characterized in that each of the sub-distributors is provided with at least one fuse with a value which corresponds to its maximum allowable power value.

5. The device as claimed in claim 3, characterized in that more than one sub-distributor is incorporated in the same structural unit, and that the structural unit is formed by a standard rack placed fixedly in the computer space.

6. The device as claimed in claim 1, characterized in that each of the sub-distributors is provided with at least one fuse with a value which corresponds to its maximum allowable power value.

7. The device as claimed in claim 6, characterized in that each of the equipment sockets in the sub-distributor is provided with a fuse with a value which corresponds to the maximum allowable power of the equipment socket with which the fuse is associated.

8. The device as claimed in claim 7, characterized in that more than one sub-distributor is incorporated in the same structural unit, and that the structural unit is formed by a standard rack placed fixedly in the computer space.

9. The device as claimed in claim 6, characterized in that more than one sub-distributor is incorporated in the same structural unit, and that the structural unit is formed by a standard rack placed fixedly in the computer space.

10. The device as claimed in claim 1, characterized in that more than one sub-distributor is incorporated in the same structural unit, and that the structural unit is formed by a standard rack placed fixedly in the computer space.

11. The device as claimed in claim 1, characterized in that the plugs placed on both ends of the connecting cable are of a type which is incompatibly formed for connection with any of the equipment sockets in the sub-distributor that is used for the connection of equipment.

12. The device as claimed in claim 1, characterized in that at least one of the distributors is provided with a direct reading measuring instrument.

13. The device as claimed in claim 1, characterized in that the components of the sub-distributors are each placed in a module, and that the housing of the sub-distributors is adapted to accommodate at least one module.

14. The device as claimed in claim 13, characterized in that at least some of the components of the sub-distributors are mounted on a DIN rail.

15. The device as claimed in claim 1, characterized in that each of the sub-distributors is provided with at least one fuse with a value which corresponds to its maximum allowable power value.

16. The device as claimed in claim 1, characterized in that more than one sub-distributor is incorporated in the same structural unit, and that the structural unit is formed by a standard rack placed fixedly in the computer space.

17. A device for supplying power to equipment disposed in a space, with varying requirements for the power supply, comprising:

a main distributor formed from a plurality of cabinets, the main distributor comprising a power supply side connected to a mains electricity supply that supplies a three phase voltage, a fuse, and a plurality of outlet sockets;

at least one sub-distributor accommodated in a closed sub-distributor housing having a plurality of cabinets, the at least one sub-distributor comprising:

a powered side which is connected to one of the plurality of outlet sockets of the main distributor by means of a breakable connection, at least one equipment socket for a single-phase voltage for the connection of equipment requiring a single-phase voltage, and at least one equipment socket for a three-phase voltage for the connection of equipment requiring a three-phase voltage; and an auxiliary power supply provided on the power supply side of the main distributor for continuing the power supply when the voltage on the mains electricity supply fails, wherein the breakable connection has a connecting cable provided with a male plug at one end of the connecting cable and a female plug at the opposite end of the connecting cable, the main distributor is provided with at least one female socket for connection of the male plug of the connecting cable, and the at least one sub-distributor is provided on its powered side with a male socket for connection of the female plug of the connecting cable, and the plurality of cabinets of the main distributor and the at least one sub-distributor include a front plate that is provided with modules each comprising a component of the equipment.

* * * * *

UNITED STATES PATENT AND TRADEMARK OFFICE
CERTIFICATE OF CORRECTION

Page 1 of 2

PATENT NO. : 7,859,130 B2
APPLICATION NO. : 11/554668
DATED : December 28, 2010
INVENTOR(S) : Diertens It is certified that error appears in the above-identified patent and that said Letters Patent is hereby corrected as shown below:

Title page, See Item (73) Assignee: line 2, "Craneo Holding B.V."
Should read -- Craneo B.V. --.

Replace the existing Sheet 3 of 3 with the attached Sheet 3 of 3 of the drawings.

Signed and Sealed this
Twenty-sixth Day of April, 2011

David J. Kappos
*Director of the United States Patent and Trademark Office*